(12) United States Patent
Shimada

(10) Patent No.: US 8,698,375 B2
(45) Date of Patent: Apr. 15, 2014

(54) VIBRATION WAVE DRIVING APPARATUS

(71) Applicant: Canon Kabushiki Kaisha, Tokyo (JP)

(72) Inventor: Akira Shimada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/780,105

(22) Filed: Feb. 28, 2013

(65) Prior Publication Data

US 2013/0234560 A1    Sep. 12, 2013

(30) Foreign Application Priority Data

Mar. 7, 2012 (JP) ................................. 2012-050024

(51) Int. Cl.
*H01L 41/08* (2006.01)

(52) U.S. Cl.
USPC ............. 310/323.12; 310/323.02; 310/323.16

(58) Field of Classification Search
USPC ............................ 310/323.02, 323.12, 323.16
See application file for complete search history.

(56) References Cited

U.S. PATENT DOCUMENTS

| | | | | |
|---|---|---|---|---|
| 5,726,515 A * | 3/1998 | Tsukimoto et al. | ...... | 310/323.12 |
| 5,739,623 A * | 4/1998 | Kanazawa et al. | ....... | 310/323.12 |
| 5,814,919 A * | 9/1998 | Okumura | ................ | 310/323.12 |
| 6,084,335 A * | 7/2000 | Tamai | ...................... | 310/316.02 |
| 6,781,283 B2 | 8/2004 | Tsukimoto | | |
| 7,531,948 B2 * | 5/2009 | Maruyama et al. | ........... | 310/369 |
| 7,608,982 B2 * | 10/2009 | Nitto et al. | ............... | 310/323.12 |
| 2002/0014811 A1 * | 2/2002 | Tamai et al. | ............. | 310/323.12 |

FOREIGN PATENT DOCUMENTS

JP    2002-291263 A    10/2002

* cited by examiner

*Primary Examiner* — Mark Budd
(74) *Attorney, Agent, or Firm* — Fitzpatrick, Cella, Harper & Scinto

(57) ABSTRACT

A vibration wave driving apparatus including: a vibrator in which a first elastic body, a second elastic body and an electrical-mechanical energy converting element provided between the first and the second elastic bodies are arranged in a direction of a rotation axis; a rotor performing a rotational motion due to the vibration excited to the first elastic body by applying a driving signal to the electrical-mechanical energy converting element; an output transmitter rotating synchronously with the rotor; and a shaft passing through the vibrator, the rotor and the output transmitter in the direction of the rotation axis, wherein the output transmitter has a fitting portion to which the shaft or a flange fixed to the shaft is fitted, and wherein a portion of the fitting portion of the output transmitter and a portion of the first elastic body are overlapped in a direction perpendicular to the rotation axis.

4 Claims, 5 Drawing Sheets (a)  (b)

VIBRATION WAVE DRIVING APPARATUS

BACKGROUND OF THE INVENTION

1. Field of the Invention

The present invention relates to a vibration wave driving apparatus and, in particular, to a vibration wave driving apparatus configured of a rotor of which one end comes into contact with a vibrator and which is frictionally driven due to the vibration excited to the vibrator and an output transmitter which engages the other end of the rotor and transmits the output of the rotor externally.

2. Description of the Related Art

Generally, a vibration wave motor that is a vibration wave driving apparatus is applied to a product for driving a camera lens or the like. In addition, an annular type and a rod type thereof exist. Hereinafter, the rod type vibration wave driving apparatus of the prior art is described (for example, Japanese Patent Application Laid-Open No. 2002-291263). FIG. 3 is a cross-sectional view illustrating a configuration of the vibration wave driving apparatus using the rod type vibrator of the prior art.

In FIG. 3, the vibration wave driving apparatus has a first elastic body 301, a second elastic body 302, a piezoelectric element 303 (an electrical-mechanical energy converting element), a shaft 304, a lower nut 305 and an upper nut 311.

The first elastic body 301, the second elastic body 302 and the laminated piezoelectric element 303 are tightened by the shaft 304 and the lower nut 305 to apply a predetermined clamping force.

A vibrator 312 is configured of the first elastic body 301, the second elastic body 302, the piezoelectric element 303, the shaft 304 and the lower nut 305 (FIG. 5).

A reference numeral 306 is a slide member and a surface of the lower end thereof comes into contact with the first elastic body 301. The slide member 306 has a structure having a small contact area and an appropriate spring characteristic. A rotor 307 rotates integrally with the slide member 306 because the rotor 307 is fixed to the slide member 306.

In addition, a gear (an output transmitter) 308 is provided on the upper surface of the rotor 307 and the gear 308 rotates integrally with the rotor 307 and transmits the output of the vibration wave driving apparatus to the outside. The upper surface of the rotor 307 has a concave portion and the concave portion engages a convex portion formed in the gear 308.

Furthermore, a flange 310 for mounting the vibration wave driving apparatus is fitted to the gear 308 and the position thereof is fixed in the thrust direction of the shaft 304. A pressurizing spring 309 is provided between the gear 308 and the rotor 307 to apply the pressurizing force to the rotor 307. In addition, in order to prevent wear of the flange 310, a flange cap 310a is pressed into the flange 310.

The laminated piezoelectric element 303 includes electrode groups having two electrodes, respectively. When an AC (alternating current) electric field having a different phase from a power source (not illustrated) is applied to each of the electrode groups, two types of bending vibration orthogonal to each other are excited to the vibrator.

(a) of FIG. 5 is a cross-sectional view of the rod type vibrator 312 and (b) of FIG. 5 illustrates the magnitude of the vibration amplitude in a vibration mode of the vibrator 312.

(b) of FIG. 5 illustrates one of two types of the bending vibration and the other occurs in a direction perpendicular to the paper surface.

Temporal phase difference of 90 degrees is possible between two types of the bending vibration by adjusting the phase of the applied AC electric field. As a result, the vibrator 312 rotates about the axis of the shaft 304 due to the bending vibration.

As a result, ellipsoidal motion is formed on the surface of the first elastic body 301 coming into contact with the slide member 306 and the slide member 306, which is pressurized by the first elastic body 301, is frictionally driven.

Accordingly, the slide member 306, the rotor 307, the gear 308 and the pressurizing spring 309 rotate integrally about the axis of the shaft 304.

The output of the vibration wave driving apparatus is transmitted from the gear 308 to the outside gear via the rotor 307.

In order to restrain whirling about the rotation axis, the inner diameter of the rotor 307 is fitted to the gear 308 and the inner diameter of the gear 308 is also fitted to the flange cap 310a.

According to the structure described above, a stable contact state is able to be maintained between the rotor 307 and the first elastic body 301 without shifting the rotor 307 from the rotation center or without a moment being acted in which the body of the rotor 307 falls with respect to a sliding surface of the gear 308.

However, it is increasingly preferable that the vibration wave driving apparatus be reduced in size according to downsizing of the camera and the vibration wave driving apparatus of the prior art described above has the following problems in regards to downsizing.

In other words, it is necessary to make the axial length of the fitting portion increased to a certain amount or more in order to avoid a decrease in the output or an increase in loss at the fitting portion between the gear 308 and the flange 310, or to suppress the occurrence of wear of the gear 308 and the flange 310 due to an increase in the contact pressure. This is a major reason hindering the downsizing of the vibration wave driving apparatus of the prior art. Hereinafter, further description on these will be made.

FIG. 4 is a cross-sectional diagram of the fitting portion between the gear 308 and the flange 310.

As illustrated in FIG. 4, when the rotational force is generated in the gear 308, a force is exerted on the gear 308 in the radial direction (direction of arrow A) from an outside gear (not illustrated) which is engaged with the gear 308.

Here, in a case where a clearance δR is excessively large, the gear 308 is inclined (310') toward the flange 310 and it causes reduction in the output.

Conversely, in a case where the clearance δR is excessively small, sliding loss between the gear 308 and the flange 310 is increased.

In such a circumstance, production in high-precision machining is required to set the clearance δR to a predetermined size. However, this will increase production cost.

Thus, even though the clearance δR has a certain size besides a predetermined one, in order to suppress the inclination of the gear 308 toward the flange 310, the axial length of the fitting portion between the gear 308 and the flange 310 is necessary to be set to a certain length or more.

In addition, in a case where the axial length of the fitting portion between the gear 308 and the flange 310 is short, when the sliding surface receives the force in the radial direction described above, the contact pressure becomes high and the gear 308 or the flange 310 is worn.

Also from such a point of view, the axial length of the fitting portion between the gear 308 and the flange 310 is necessary to be set to a certain length or more.

Thus, a ratio of the axial length of the fitting portion between the gear 308 and the flange 310 is large in the direction of the rotation axis of the vibration wave driving apparatus of the prior art and it becomes a limitation in the downsizing.

SUMMARY OF THE INVENTION

The invention provides a vibration wave driving apparatus in which the downsizing is able to be achieved without reducing performance thereof and with a low cost in view of the problems described above.

A vibration wave driving apparatus according to the invention includes: a vibrator in which a first elastic body, a second elastic body and an electrical-mechanical energy converting element provided between the first and the second elastic bodies are arranged in a direction of a rotation axis; a rotor which performs a rotational motion due to the vibration excited to the first elastic body by applying a driving signal to the electrical-mechanical energy converting element; an output transmitter which rotates synchronously with the rotor; and a shaft which passes through the vibrator, the rotor and the output transmitter in the direction of the rotation axis, wherein the output transmitter has a fitting portion to which the shaft or a flange fixed to the shaft is fitted, and wherein a portion of the fitting portion of the output transmitter and a portion of the first elastic body are overlapped in a direction perpendicular to the rotation axis (that is, positioned inside a plane perpendicular to the direction of the rotation axis).

According to the invention, the vibration wave driving apparatus in which the downsizing is able to be achieved without reducing performance thereof and with a low cost may be realized.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Forms for carrying out the invention will be described using the following embodiments.

First Embodiment

A configuration example of the vibration wave driving apparatus to which the invention is applied is described as a first embodiment. The vibration wave driving apparatus of the embodiment includes a first elastic body, a second elastic body and a vibrator in which an electrical-mechanical energy converting element provided between them are arranged in a direction of a rotation axis. In addition, the vibration wave driving apparatus includes a rotor which performs a rotational motion due to the vibration excited to the first elastic body by applying a driving signal to the electrical-mechanical energy converting element and an output transmitter which rotates synchronously with the rotor.

Figure 1:
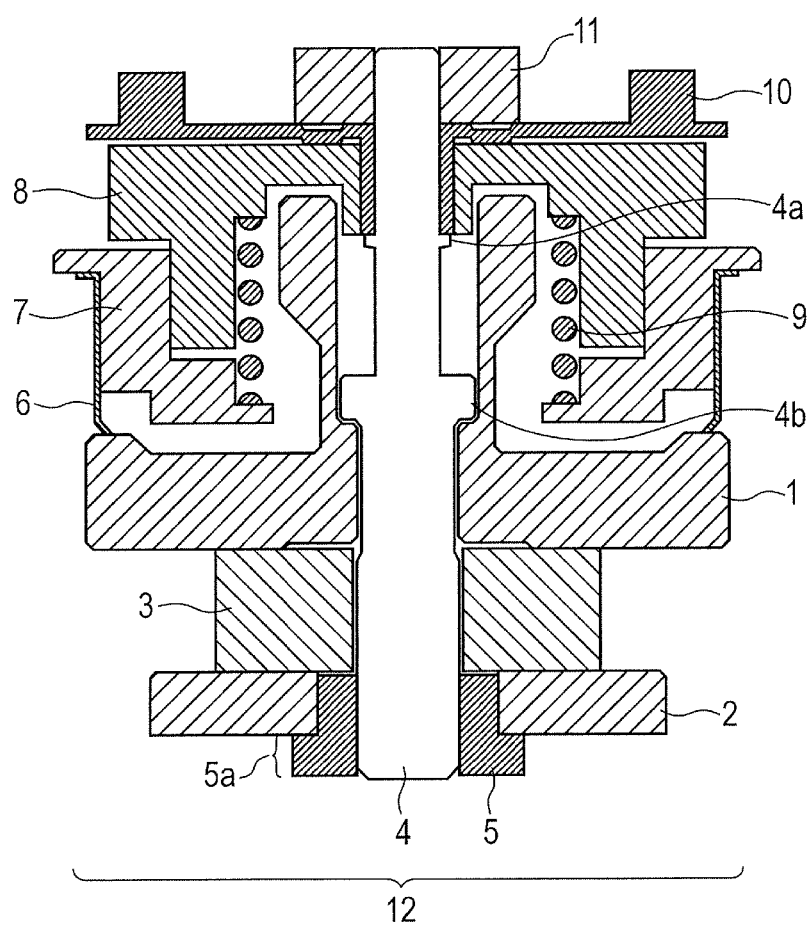
FIG. 1 is a cross-sectional view illustrating a configuration example of a vibration wave driving apparatus.

As illustrated in FIG. 1, in the specific configuration thereof, the vibration wave driving apparatus comprises a first elastic body 1, a second elastic body 2, a piezoelectric element 3 (an electrical-mechanical energy converting element), a shaft 4, an upper projecting portion 4a, a lower projecting portion 4b, a lower nut 5 and a projecting portion 5a.

The vibration wave driving apparatus also comprises a slide member 6, a rotor 7, a gear 8 (an output transmitter), a pressurizing spring 9, a flange 10 and an upper nut 11.

Then, in the vibration wave driving apparatus of the embodiment, a rod type vibrator 12 is configured of the first elastic body 1, the second elastic body 2, the piezoelectric element 3, the shaft 4 and the lower nut 5. The shaft 4 passes through the vibrator 12, the rotor 7 and the gear 8 in the direction of the rotation axis. The flange 10 has a fixed end which is fixed to the outside.

The driving principle of the vibration wave driving apparatus is the same as the prior art described above and, here, configurations which are different from the vibration wave driving apparatus of the prior art will be described.

The inner diameter of the flange 10 is fitted to the shaft 4 and comes into contact with the upper projecting portion 4a of the shaft 4 so that the flange 10 is positioned in a thrust direction (the same direction as the direction of the rotation axis). In addition, the flange 10 is fixed by the upper nut 11.

The inner diameter of the gear 8 is fitted to the flange 10. The gear 8 is pressurized in the thrust direction by a reaction force of the pressurizing spring 9 applying the pressurizing force to the rotor 7 and a contact surface of the flange 10 which comes in contact with the projecting portion receiving the pressurizing force. However, in the invention, the gear 8 may be fitted to the shaft 4. In other words, the flange 10 may not be intervened between the gear 8 and the shaft.

When the rotor 7 rotates, the gear 8 rotates integrally with the rotor 7 while sliding on the contact surface with the flange and on the surface of the inner diameter side thereof.

Here, a clearance δR of the fitting portion between the gear 8 and the flange 10 is set to be an appropriate value considering the stability and load of a sliding bearing.

In other words, since the contact pressure is large when the clearance δR is excessively small, the load is increased and when the clearance δR is excessively large, decrease in the output is caused by whirling.

In addition, the axial length of the fitting portion is also set to be an appropriate value. In other words, since decrease in the output is caused by the whirling when the length is excessively small and the contact area is increased when the length is excessively large, the load is increased. In addition, the contact pressure to the sliding surface is increased and the wear of the gear 8 or flange 10 is caused when the length is excessively small.

The first elastic body 1 is clamped by the shaft and the lower nut 5. The shaft 4 has the lower projecting portion 4b to clamp the first elastic body 1. A hollow portion including a space through which the lower projecting portion 4b passes is provided at the upper portion of the inner diameter side of the first elastic body 1.

As described above, in the embodiment, the gear 8 includes the fitting portion to which the flange 10 is fitted and the gear 8 is fitted to the flange 10 in the fitting portion. In addition, the flange 10 and the shaft 4 are fixed, and the flange 10 is fixed to the outside at the fixed end of the upper portion thereof. Furthermore, the shaft 4 supports the first elastic body by clamping the first elastic body with the lower nut 5.

Then, a portion of the fitting portion between the gear 8 and the flange 10 and a portion of the first elastic body 1 are overlapped in a direction perpendicular to the direction of the rotation axis. In other words, the surface of the inner diameter side of the first elastic body 1 in the hollow portion and the outer diameter surface of the gear 8 in the fitting portion are arranged to face to each other inside the hollow portion which is formed between the inner diameter side of the first elastic body 1 and the shaft 4.

In other words, a portion of the gear 8 of a region in the fitting portion is configured so as to be positioned inside the hollow portion.

Accordingly, the entire length of the vibration wave driving apparatus is able to be shortened while keeping the axial length of the fitting portion set to an appropriate value.

Furthermore, in the case of the embodiment, since the fitting portion between the gear 8 and the flange 10 is arranged in the inner diameter side of the first elastic body 1 and the sliding diameter between the gear 8 and the flange 10 is small compared to the prior art, a linear velocity is decreased even at the same rotational velocity and the load is also decreased due to the sliding.

Thus, the load of the vibration wave motor that is the vibration wave driving apparatus is able to be decreased. In addition, degradation of the characteristics of the gear 8 or the flange 10 due to wear is able to be reduced.

The flange 10 is made of a material having strength and excellent wear resistance, for example, stainless steel or the like.

It is preferable that the gear use a resin from the viewpoint of workability and cost. In addition, in order to reduce the wear of the gear 8, a lubricant such as grease may be used between the flange 10 and the gear 8.

In addition, as described above, in the invention, the gear 8 and the shaft 4 may be fitted to each other. In other words, a portion of the fitting portion between the gear 8 and shaft 4 and a portion of the first elastic body are overlapped in a direction perpendicular to the direction of the rotation axis.

Also, in this case, the surface of the inner diameter side of the first elastic body 1 in the hollow portion and the outer diameter surface of the gear 8 in the fitting portion are arranged to face to each other inside the hollow portion which is formed between the inner diameter side of the first elastic body 1 and the shaft 4. In other words, a portion of the gear 8 of the region in the fitting portion is configured so as to be positioned inside the hollow portion.

In order to realize further downsizing in the embodiment, the lower nut 5 has a structure described below.

In order to prevent loosening or wear of a screw due to the vibration of the rod type vibrator, the lower nut 5 needs to have a predetermined length of the screw.

In addition, as described above, the lower nut 5 needs to fasten the first elastic body 1, the second elastic body 2 and the piezoelectric element 3 with the shaft 4.

Here, the lower nut 5 has a structure in which a projecting portion 5a is provided in the radial direction. The second elastic body 2 is fastened with the projecting portion 5a.

In addition, the portion of the upper side of the lower nut 5 is configured to be positioned in the inner diameter side of the second elastic body 2 and the surface of the outer diameter side of the lower nut 5 is fitted to the second elastic body 2.

According to the configuration described above, the lower nut 5 has a predetermined screw length so that the downsizing is able to be realized.

Second Embodiment

As the second embodiment, a configuration example of the vibration wave driving apparatus which is different from the first embodiment will be described by using FIG. 2.

The driving principle of the vibration wave driving apparatus is the same as the prior art and, here, a configuration which is different from that of the vibration wave driving apparatus of the first embodiment will be described.

Also in the embodiment, a portion of the fitting portion between a gear 108 and a flange 110, and a portion of the first elastic body 1 are overlapped in a direction perpendicular to the rotation axis.

However, the first embodiment is configured such that a portion of the fitting portion between the gear 8 and the flange 10 is positioned inside the hollow portion between the first elastic body 1 and the shaft 4. However, the second embodiment is different from the first embodiment in that the fitting portion is positioned in the outside of the hollow portion which is formed in the first elastic body 1. In other words, the second embodiment is configured such that a portion of the first elastic body 1 is positioned between a portion of the region of the fitting portion between the gear 108 and the flange 110, and the shaft 4.

In other words, the surface of a portion of the first elastic body 1 and the surface of a portion of the flange 110 of which the outer diameter is fitted to the gear 108 are arranged to face to each other.

Then, the surface of the outer diameter of the flange 110 in the fitting portion and the surface of the inner diameter of the gear 108 in the fitting portion are configured to slide to each other.

Figure 2:
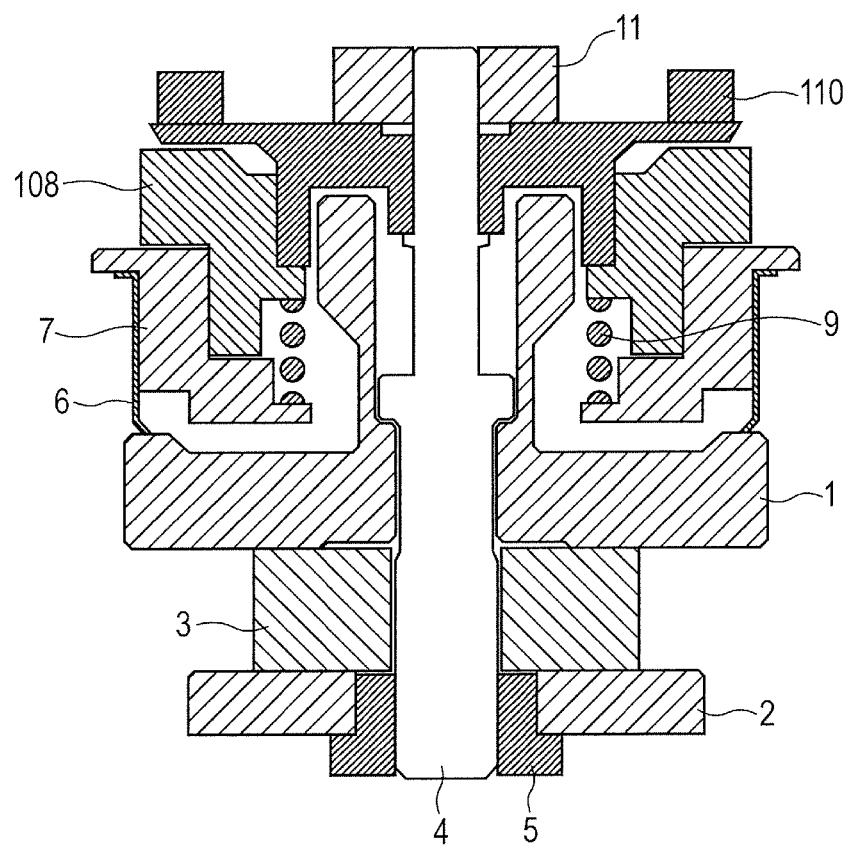
FIG. 2 is a cross-sectional view illustrating a configuration example of the vibration wave driving apparatus.
Figure 3:
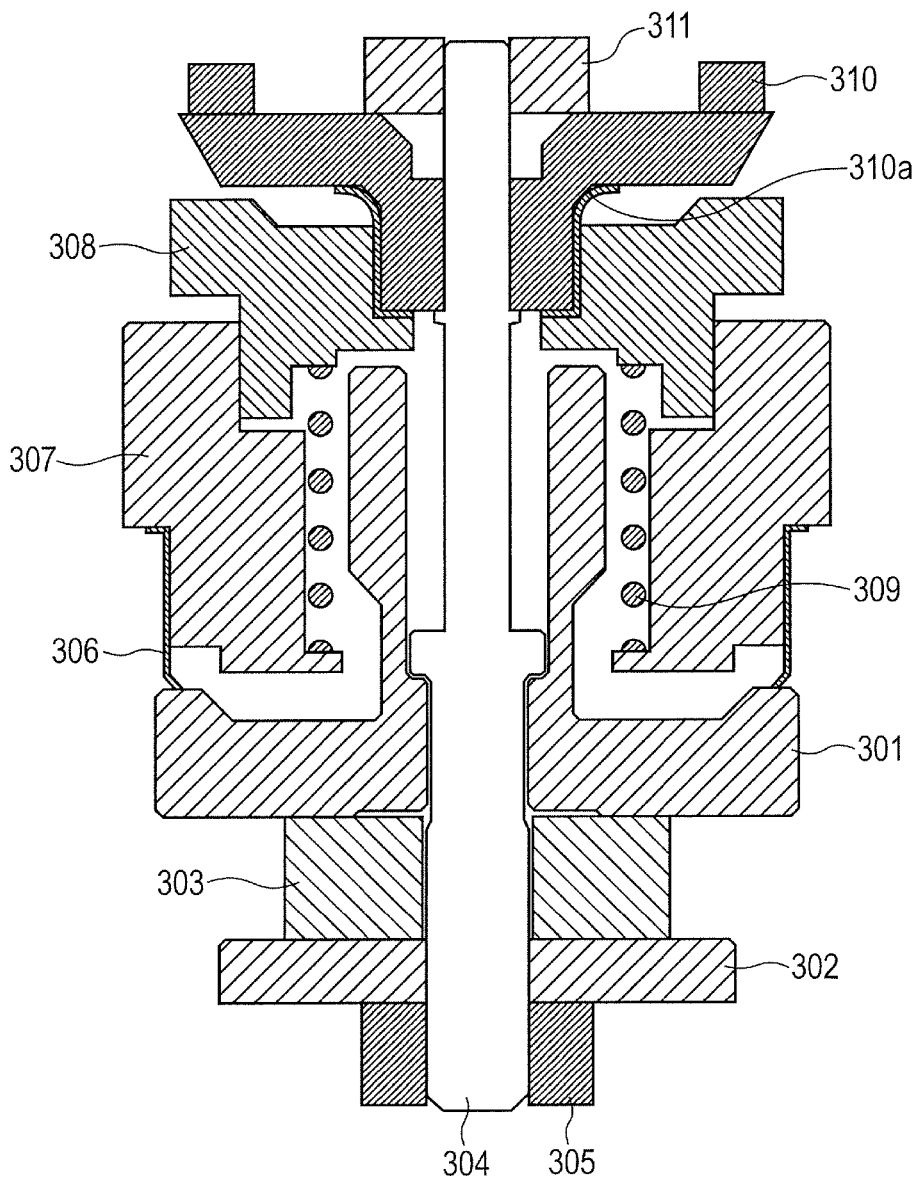
FIG. 3 is a cross-sectional view of the vibration wave driving apparatus.
Figure 4:
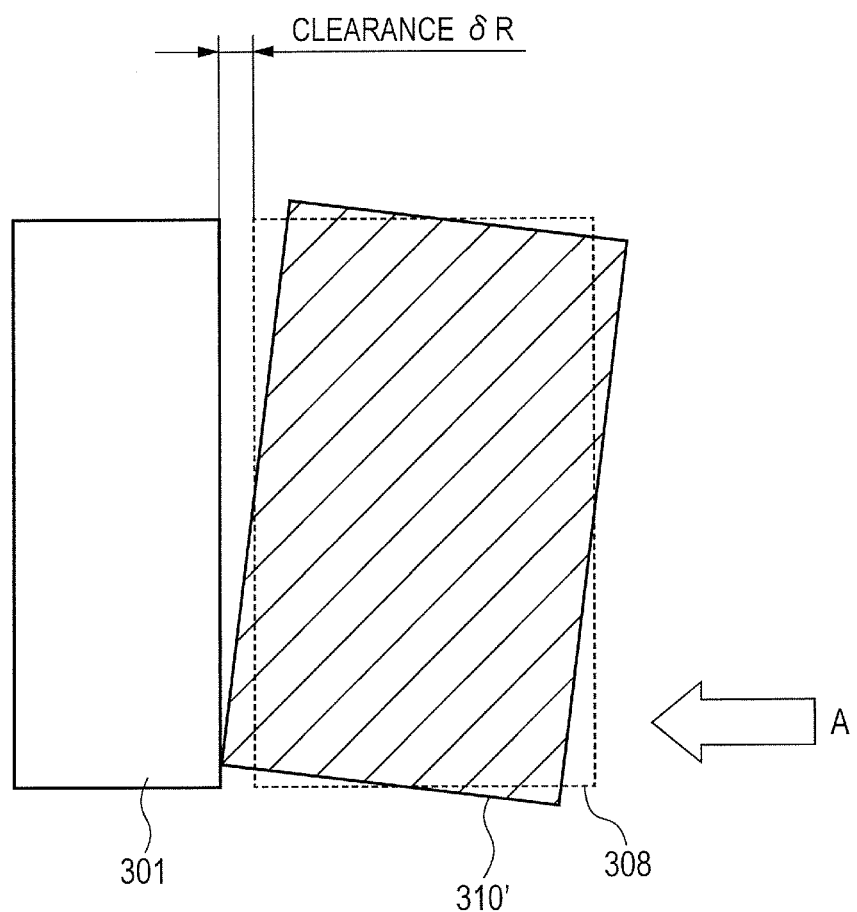
FIG. 4 is a cross-sectional diagram illustrating a fitting portion between a shaft and a flange in the vibration wave driving apparatus.
Figure 5:
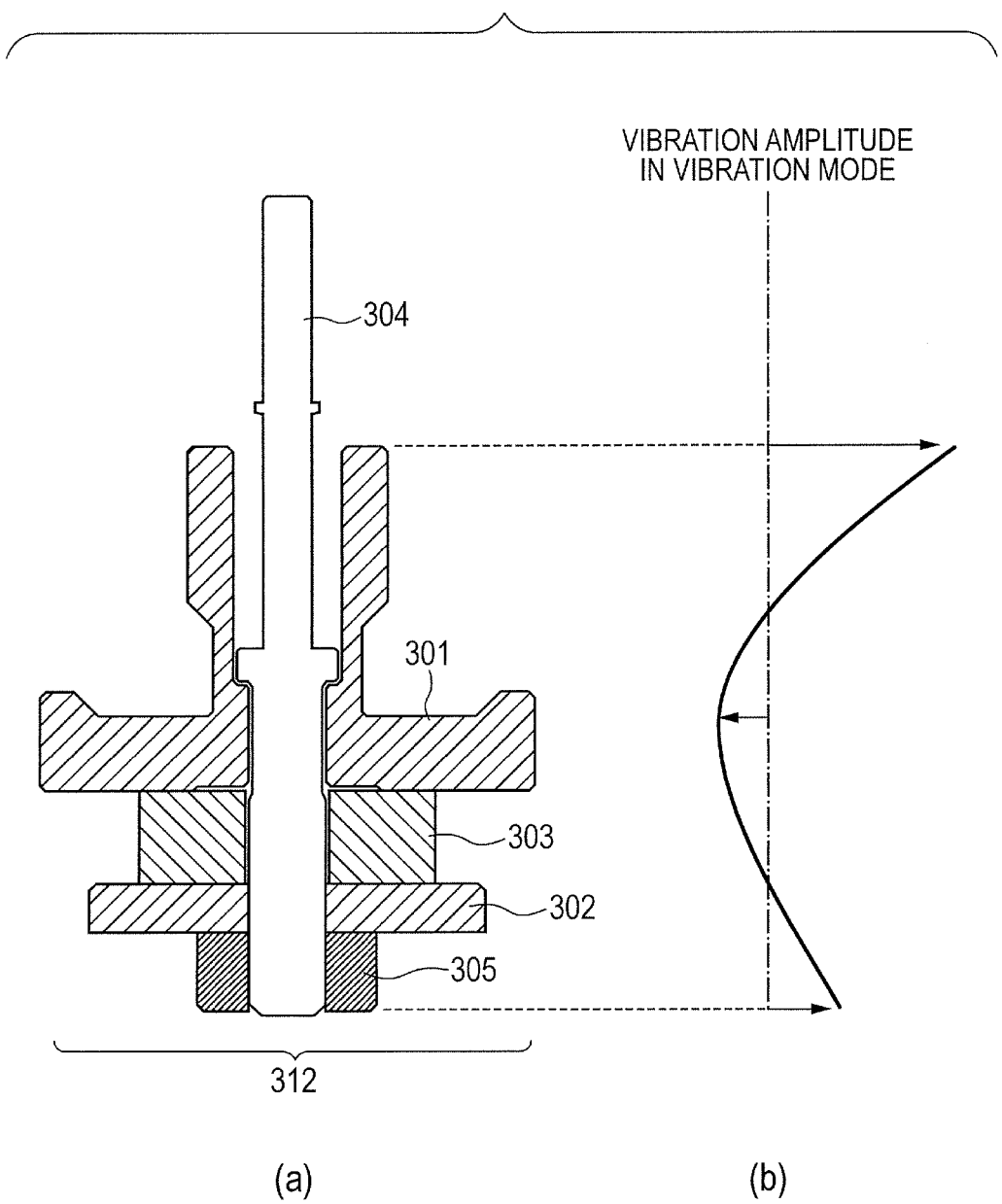
FIG. 5 includes views illustrating an ellipsoidal motion in the vibration wave driving apparatus, with (a) being a cross-sectional view of a rod type vibrator and (b) illustrating a vibration mode of the rod type vibrator.

In addition, as illustrated in FIG. 2, it is preferable that a portion of the inner diameter side of the flange 110 faces the surface of the inner diameter side of the first elastic body 1 in the hollow portion. According to the structure described above, the entire length of the vibration wave driving apparatus is able to be shortened while keeping the axial lengths of the fitting portion between the shaft 4 and the flange 110 and the fitting portion between the flange 110 and the gear 108 set to appropriate values.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-050024, filed Mar. 7, 2012, which is hereby incorporated by reference herein in its entirety.

What is claimed is:
1. A vibration wave driving apparatus comprising:
a vibrator in which a first elastic body, a second elastic body and an electrical-mechanical energy converting element provided between the first and the second elastic bodies are arranged in a direction of a rotation axis;
a rotor which performs a rotational motion due to the vibration excited to the first elastic body by applying a driving signal to the electrical-mechanical energy converting element;
an output transmitter which rotates synchronously with the rotor; and
a shaft which passes through the vibrator, the rotor and the output transmitter in the direction of the rotation axis,
wherein the output transmitter has a fitting portion to which the shaft or a flange fixed to the shaft is fitted, wherein a portion of the fitting portion of the output transmitter and a portion of the first elastic body are overlapped in a direction perpendicular to the direction of the rotation axis, and wherein a portion of the first elastic body is positioned inside the output transmitter.

2. The vibration wave driving apparatus according to claim 1, wherein the first elastic body has a hollow portion between an inner diameter side of the first elastic body and the shaft, and wherein a portion of a region in the fitting portion of the output transmitter is positioned inside the hollow portion formed in the first elastic body.

3. The vibration wave driving apparatus according to claim 1, wherein a portion of the first elastic body is positioned between a portion of a region in the fitting portion of the output transmitter and the shaft.

4. The vibration wave driving apparatus according to claim 1, further comprising:

a nut clamping the vibrator with the shaft, wherein a portion of the nut is positioned in an inner diameter side of the second elastic body.

* * * * *